UNITED STATES PATENT OFFICE.

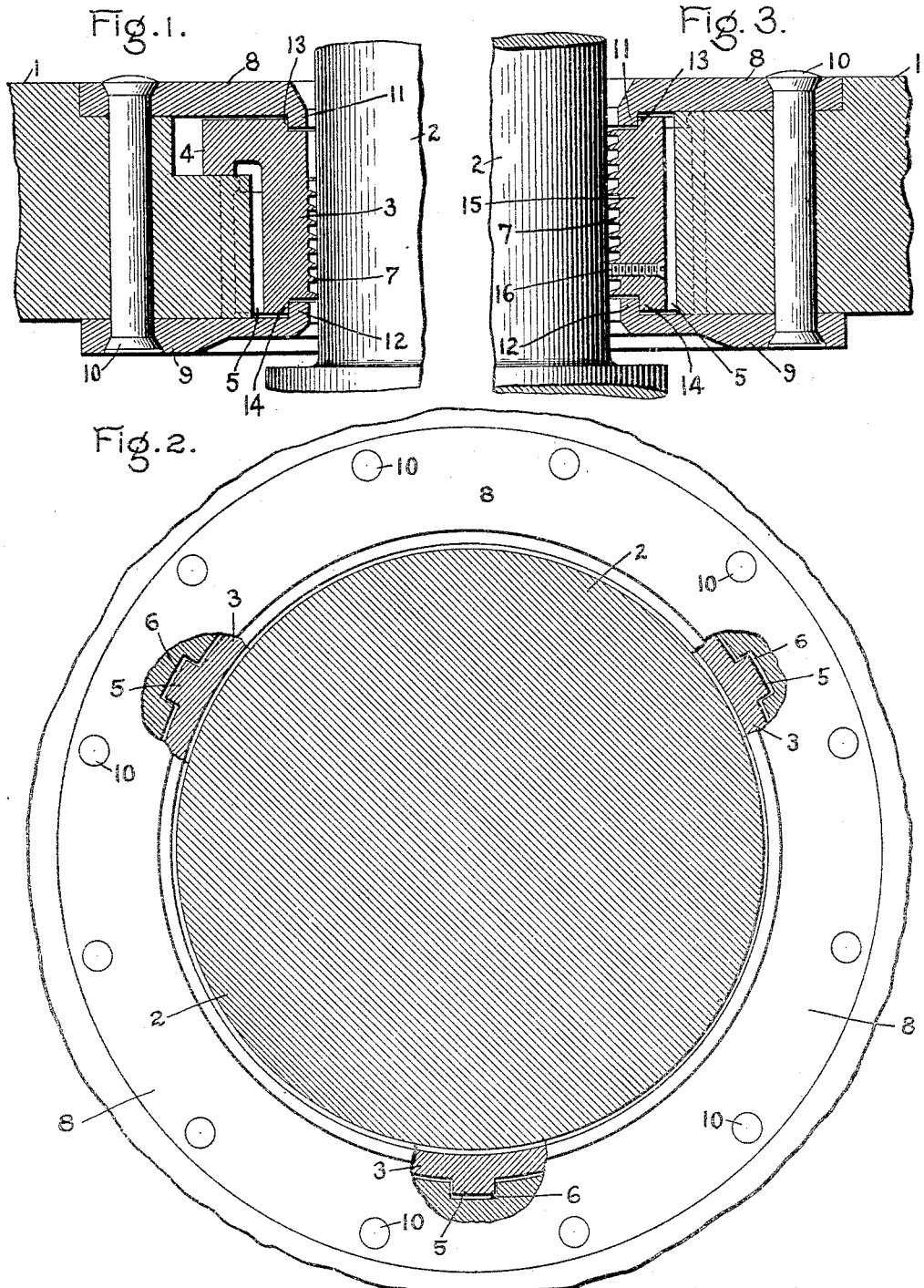

OSCAR JUNGGREN, OF SCHENECTADY, NEW YORK, ASSIGNOR TO GENERAL ELECTRIC COMPANY, A CORPORATION OF NEW YORK.

PACKING FOR ELASTIC-FLUID-TURBINE SHAFTS.

957,887.  Specification of Letters Patent.  Patented May 17, 1910.

Application filed September 28, 1908. Serial No. 455,171.

*To all whom it may concern:*

Be it known that I, OSCAR JUNGGREN, a citizen of the United States, residing at Schenectady, county of Schenectady, State of New York, have invented certain new and useful Improvements in Packing for Elastic-Fluid-Turbine Shafts, of which the following is a specification.

This invention relates to shaft packings for elastic fluid turbines whether vertical or horizontal.

In a multi-stage machine in which stationary diaphragms or walls are used, packing must be provided where the shaft passes through them to restrict the leakage of elastic fluid from one side of the diaphragm to the other. Owing to the unequal pressures and temperatures of the steam on opposite sides of the diaphragms they tend to distort, and this distortion varies with the variations in temperature and pressure of the steam. The shaft also expands and contracts with variations in temperature, so that it is a difficult matter to secure a packing for the joint between the diaphragm and the shaft. The expansion and contraction of the wheel casing independently of the supporting base and pillow blocks in a horizontal machine also has much to do with the problem of making a satisfactory packing. It has been proposed to use a ring or sleeve surrounding the shafting fastened to the diaphragm and provided with internal circumferential fluid-baffling ribs or screw threads which stand close to the shaft and wear off in case the warping or expansion of the parts causes the shaft to come in contact with said ribs. It is found, however, that if the sleeve is rigidly fastened it will wear unevenly and expand irregularly, and sometimes breaks in pieces and makes trouble.

My invention aims to obviate these difficulties and provide a packing sleeve which will reduce to a minimum the leakage of steam through the diaphragm, and will be accurately centered with reference to the opening in the diaphragm and yet free to expand and contract independently thereof in every direction. The sleeve is held by an annular retainer comprising in the present embodiment of my invention plates which prevent it from dropping into the chamber below in case it breaks in pieces.

The essential differences between this packing and the previous ones which have been used are as follows: 1. If the packing ring is firmly bolted to the diaphragm or centered by the same, it is bound to follow the movements of the diaphragm to a more or less extent and as the bore of the diaphragm confining this packing ring gets smaller when the load comes on the machine, owing to the construction of the diaphragm, it will compress the packing ring if firmly fastened to it and thereby reduce the clearance and contact is usually the result. 2. If the packing is firmly bolted and centered by the diaphragm on the outside of the ring, as has heretofore been done, when the shaft touches the packing ring a heating immediately takes place which expands the packing ring, and as it is centered on the outside it is prevented from expanding outward; therefore, it expands inward, and causes still further touching and heating. 3. In the proposed construction it will be noticed that the above mentioned difficulties are eliminated, as the bore of the diaphragm can reduce, leaving the packing undisturbed and the ring may expand freely in every direction. Therefore, as soon as touching between the ring and the shaft occurs the ring gets larger due to the expansion and automatically relieves the difficulty. The grooving in the inside of the ring is made sometimes of concentric rings and sometimes in the form of a screw thread. In the latter case a small screw is inserted to stop the flow of steam. The only difference between a screw thread and concentric rings is facility in machining, which is dependent upon size.

In the accompanying drawing, which illustrates embodiments of my invention, as applied to a vertical turbine, Figure 1 is a vertical section of a packing sleeve with its retainer and a portion of the shaft and diaphragm; Fig. 2 is a plan view of the same, partly in section; and Fig. 3 is a view similar to Fig. 1 showing a modification.

The diaphragm or wall 1 is usually made of cast iron or steel and is bored centrally to permit the forged steel shaft 2 to pass through it. The diameter of the opening in the diaphragm is considerably larger than that of the shaft, to give room for the packing sleeve 3 which is made of either cast iron or bronze, depending upon the size and build of the turbine and the service required.

It may be made of other metals without departing from my invention.

In Fig. 1 the diaphragm is recessed or shouldered to receive a flange 4 formed integral with one end of the annular packing sleeve and extending perpendicular to the axis of the shaft. The under side of the flange is faced off to make a good steam tight sliding fit with the upper surface of the shoulder, which is machined to receive it. The body of the sleeve extends parallel with the shaft, and is separated from the bore of the diaphragm by a substantial space. On its outer surface are axially extending locking lugs 5, Fig. 2, engaging loosely with grooves 6 in the bore of the diaphragm to prevent the sleeve from rotating with the shaft. The interior of the sleeve is provided with a series of inwardly projecting ribs 7 which extend either circumferentially or helically around the sleeve for a portion of its length. The edges of these fluid-baffling ribs are narrow, so that in event of the shaft rubbing against them they will be quickly worn down sufficiently to permit the shaft to turn freely. The clearance between the ribs and the shaft is made as small as possible, to prevent undue leakage of steam along the shaft; said clearance being only a small fraction of an inch. The ribs are omitted from the packing sleeve at that portion which is in line with the heavy flange 4 so that unequal expansion and contraction or irregular movements of said flange cannot result in injury to the shaft or packing.

Inasmuch as the sleeve is not fastened to the diaphragm, it can expand freely in any direction when heated, either by increase in steam temperature or by the friction of the shaft when the two come in contact, or both. Owing to the difference in the masses of the sleeve, shaft and diaphragm, the sleeve will heat and cool more rapidly than the others and hence will expand and contract at a different rate, causing it to slide to and fro on the shoulder of the diaphragm. A sleeve thus supported will not contract in such a way as to return concentrically to its former position, but tends to shift about owing to unequal friction on different points of its supporting surface. Hence it becomes necessary to provide means for re-centering the packing sleeve after expansion to prevent it from binding at some point and engaging the shaft and producing undue wear.

In order to effect the initial and re-centering action, I provide a retainer comprising upper and lower annular retaining plates 8, 9, concentric with the opening in the diaphragm and secured respectively to the top and bottom of the diaphragm by through rivets 10 or other means. If desired, one or both of these may be rabbeted into the diaphragm, the upper plate 8 being so shown in Fig. 1. Around the inner edge of each plate is a lip 11, 12 that on the upper plate extending downward while the one on the lower plate extends upward. These lips engage annular shoulders 13, 14 at the upper and lower ends, respectively, of the packing sleeve, whose length is a little less than the distance between the two plates, so that it can expand and contract in an axial direction without binding. The packing sleeve is thus free to move laterally between the plates, its flange sliding readily on the shoulder of the diaphragm. It can expand outwardly and longitudinally without hindrance, but in contracting toward the shaft it will be brought back to its former position by the centering action of the lips on the plates and the shoulders on the sleeve. It is thus prevented from bearing unduly against the shaft, but in case the shaft becomes eccentric to the opening in the diaphragm, by reason of distortion of the diaphragm or shaft, or both, the ribs on that side of the sleeve in contact with the shaft will quickly wear off and the friction loss will be reduced to normal again.

In Fig. 3 the packing sleeve 15 has no flange 4, and the internal ribs cover the entire interior surface and are helical. A plug 16 is interposed at one point in the groove between said ribs, to prevent the steam from leaking through said groove which, owing to its helical form, would otherwise constitute a continuous passage from one side of the diaphragm to the other. This packing sleeve has been found to be very satisfactory, suffering no undue wear and being not liable to breakage. If, however, it should break, owing to wear, or a flaw in the material, or some sudden stress, the pieces will be held by the retaining plates and prevented from dropping in among the revolving parts of the turbine. By using rivets instead of bolts or screws to fasten the retaining plates I obviate the danger of their jarring loose and falling into the machine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination with a wall having an opening, a shaft extending therethrough, a loose sleeve surrounding the shaft in said opening and free to expand and contract transversely and longitudinally with respect to the shaft axis, and a retainer for the sleeve which permits said expansion and contraction and also serves to recenter it each time it contracts.

2. In combination with a wall having an opening, a shaft extending therethrough, a loose packing sleeve surrounding the shaft in said opening and free to expand and contract axially and circumferentially, a retainer which holds the sleeve within said opening without restraining its movements under increases in temperature, and a means which recenters the packing sleeve each time it cools.

3. In combination with a wall having an opening, a shaft extending therethrough, a packing sleeve surrounding the shaft within the opening and provided with internal ribs to baffle the passage of fluid between its ends, and a retainer for the sleeve which permits it to expand freely and recenters it each time it contracts.

4. In combination with a wall having an opening, a shaft extending therethrough, a packing sleeve surrounding the shaft within the opening and provided with internal ribs to baffle the passage of fluid between its ends, means that prevents the sleeve from turning without restricting its movements due to temperature changes, and a retainer that supports the sleeve by its ends and recenters it each time it contracts.

5. In combination with a wall having an opening, a shaft extending through said opening, a loose sleeve surrounding said shaft in said opening and free to expand, and means for centering said sleeve when it contracts.

6. In combination with a wall having an opening, a shaft passing through said opening, a loose sleeve surrounding said shaft in said opening and free to expand, and retaining plates fastened to said wall and engaging with said sleeve.

7. In combination with a wall having an opening, a shaft passing through said opening, a loose sleeve surrounding said shaft in said opening and having a shoulder at each end, and retaining plates fastened to said wall and provided with lips engaging said shoulders.

8. In combination with a wall having an opening, a shaft passing through said opening, annular retaining plates riveted to the top and bottom of said wall and provided with circumferential lips on their inner edges, and a packing sleeve surrounding said shaft and free to expand between said plates, said sleeve having internal shoulders engaged by said lips to center the sleeve when it contracts.

9. In combination with a diaphragm provided with an opening, a shaft extending through the opening, a packing sleeve surrounding the shaft and arranged within said opening, means that prevents the sleeve from turning without restricting its movements due to temperature changes, and a retainer for the sleeve comprising means that supports the sleeve so that it is free to expand and contract as its temperature changes, and a device that re-centers said sleeve when it contracts.

10. The combination with a diaphragm provided with an opening, of a rotating shaft which passes through the opening, a packing ring or sleeve arranged in the opening, which sleeve surrounds the shaft next its surface and checks leakage along said surface from one side of the diaphragm to the other, means for preventing the rotation of the sleeve, a retainer carried by the diaphragm in which the sleeve is mounted so that it is free to expand and contract as its temperature changes, and means for centering the sleeve with respect to the shaft when it contracts.

In witness whereof I have hereunto set my hand this 26th day of September, 1908.

OSCAR JUNGGREN.

Witnesses:
BENJAMIN B. HULL,
MARGARET E. WOOLLEY.